(12) United States Patent
Ruemer et al.

(10) Patent No.: US 10,889,666 B2
(45) Date of Patent: Jan. 12, 2021

(54) MOLECULAR MODIFICATION OF POLYETHYLENE RESIN

(71) Applicant: BOREALIS AG, Vienna (AT)

(72) Inventors: Franz Ruemer, St. Georgen/Gusen (AT); Carl-Gustav Ek, Västra Frölunda (SE); Mattias Bergqvist, Gothenburg (SE)

(73) Assignee: BOREALIS AG, Vienna (AT)

( * ) Notice: Subject to any disclaimer, the term of this patent is extended or adjusted under 35 U.S.C. 154(b) by 38 days.

(21) Appl. No.: 16/301,610

(22) PCT Filed: May 23, 2017

(86) PCT No.: PCT/EP2017/062328
§ 371 (c)(1),
(2) Date: Nov. 14, 2018

(87) PCT Pub. No.: WO2017/202802
PCT Pub. Date: Nov. 30, 2017

(65) Prior Publication Data
US 2019/0177448 A1 Jun. 13, 2019

(30) Foreign Application Priority Data
May 26, 2016 (EP) ..................................... 16171460

(51) Int. Cl.
| | | |
|---|---|---|
| C08F 10/02 | (2006.01) | |
| C08K 5/14 | (2006.01) | |
| C08F 8/50 | (2006.01) | |
| C08L 23/26 | (2006.01) | |
| C08J 11/22 | (2006.01) | |
| C08F 8/00 | (2006.01) | |
| C08L 23/04 | (2006.01) | |
| C08J 3/12 | (2006.01) | |
| C08J 3/22 | (2006.01) | |

(52) U.S. Cl.
CPC .............. *C08F 10/02* (2013.01); *C08F 8/00* (2013.01); *C08F 8/50* (2013.01); *C08J 3/12* (2013.01); *C08J 3/22* (2013.01); *C08J 11/22* (2013.01); *C08K 5/14* (2013.01); *C08L 23/04* (2013.01); *C08L 23/26* (2013.01); C08F 2810/00 (2013.01); C08F 2810/10 (2013.01); C08F 2810/20 (2013.01); C08J 2323/06 (2013.01); C08L 2023/40 (2013.01); C08L 2023/44 (2013.01); C08L 2205/025 (2013.01); C08L 2207/062 (2013.01); Y02W 30/62 (2015.05)

(58) Field of Classification Search
CPC ...... C08F 10/02; C08F 110/02; C08F 210/02; C08F 8/06; C08F 2500/12; C08F 2810/00; C08F 2810/10
See application file for complete search history.

(56) References Cited

U.S. PATENT DOCUMENTS

| | | | |
|---|---|---|---|
| 4,578,431 A | 3/1986 | Shaw et al. | |
| 8,968,851 B2 * | 3/2015 | Walter | ..................... F16L 9/12 |
| | | | 428/36.9 |
| 2003/0199597 A1* | 10/2003 | Abe | ........................ C08J 9/0061 |
| | | | 521/50 |
| 2005/0031813 A1* | 2/2005 | Conrnette | ............. C08F 255/02 |
| | | | 428/35.7 |
| 2008/0176994 A1 | 7/2008 | Allermann et al. | |
| 2009/0213681 A1* | 8/2009 | Ek | ....................... B29C 48/2552 |
| | | | 366/76.1 |
| 2012/0128912 A1 | 5/2012 | Ek et al. | |
| 2015/0025195 A1* | 1/2015 | Cottle | ..................... C08L 23/06 |
| | | | 525/52 |
| 2018/0030163 A1* | 2/2018 | Wittner | ..................... C08F 6/02 |

FOREIGN PATENT DOCUMENTS

| | | |
|---|---|---|
| CN | 103242580 A | 8/2013 |
| DE | 10343964 A1 | 4/2005 |
| EP | 0318841 A2 | 6/1989 |
| EP | 0404552 A2 | 12/1990 |
| EP | 1186618 A1 | 3/2002 |
| EP | 2770016 A1 | 8/2014 |
| EP | 2860202 A1 | 4/2015 |
| EP | 2966123 A1 | 1/2016 |
| GB | 1362476 A | 8/1974 |
| JP | H 07-130238 * | 5/1995 |
| JP | 2008-163327 * | 7/2008 |
| WO | 9732922 | 9/1997 |
| WO | 2013101767 A2 | 7/2013 |

OTHER PUBLICATIONS

Translation of JPH 07-130238 (Year: 1995).*
Translation of JP 2008-163327 (Year: 2008).*
Kaye, A. et al. "Definition of terms relating to the non-ultimate mechanical properties of polymers", Pure & Appl. Chem., (1998), 70, 3, pp. 701-754.

(Continued)

*Primary Examiner* — Robert C Boyle
(74) *Attorney, Agent, or Firm* — Meunier Carlin & Curfman LLC

(57) ABSTRACT

The invention is related to a process for producing modified polyethylene having decreased melt flow rate (5 kg, 190° C.) (MFR). In particular, the present invention is directed to a process in a controlled manner for producing modified polyethylene recyclates having low MFR and low gel content directly by reactive extrusion processing.

16 Claims, 1 Drawing Sheet

(56) References Cited

OTHER PUBLICATIONS

Heino, E.L. et al., "Rheological characterization of polyethylene fractions", Theor. Appl. Rheol., Proc. Int. Congr. Rheol, (1992), 1, pages.
Heino, E.L. et al., "The influence of molecular structure on some rheological properties of polyethylene", Borealis Polymers Oy, Porvoo, Finland, Annual Transactions of the Nordic Rheology Society, 1995, pp. 71-73.
International Search Report and Written Opinion dated Jul. 7, 2017 for International Application No. PCT/EP2017/062328.
Rauwendaal, C. "Polymer Extrusion", Carl Hanser Verlag, Munich 1986, pp. 233-277 and 395-415.
Parmar, Harisinh, "Rheology of peroxide modified high density polyethylene", Thesis, RMIT University, 2007.

\* cited by examiner

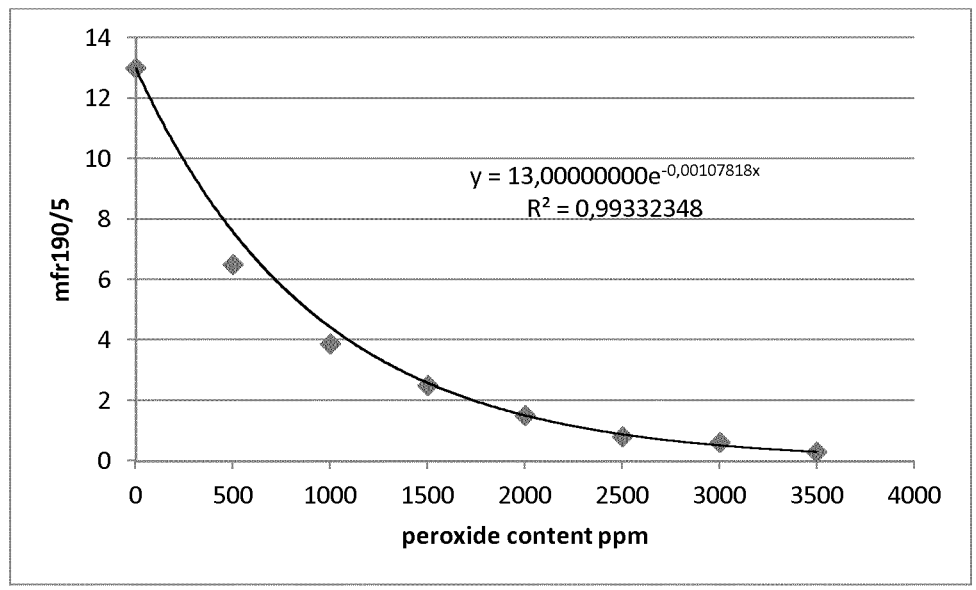

MOLECULAR MODIFICATION OF POLYETHYLENE RESIN

CROSS-REFERENCE TO RELATED APPLICATIONS

This application is a national stage application filed under 35 U.S.C. § 371 of PCT/EP2017/062328 filed May 23, 2017, which claims the benefit of priority to European Application No. 16171460.5 filed May 26, 2016, both of which are hereby incorporated herein by reference in their entireties.

FIELD OF THE INVENTION

The present invention is directed to a process for producing modified polyethylene having decreased melt flow rate (5 kg, 190° C.) (MFR). In particular, the present invention is directed to a process in a controlled manner for producing modified polyethylene recyclates having low MFR and low gel content directly by reactive extrusion processing.

BACKGROUND OF THE INVENTION

For the purposes of the present description and the subsequent claims, the term "recycled waste" and "recyclate" are used to indicate the material recovered from at least one of post-consumer waste and industrial waste. Post-consumer waste refers to objects having completed at least a first use cycle (or life cycle), i.e. having already served their first purpose, while industrial waste refers to the manufacturing scrap which does normally not reach a consumer. The term "virgin" denotes newly-produced materials and/or objects prior to first use and not being recycled.

Nowadays, the attempt of using polymers obtained from waste materials for the manufacturing of new products is of increasing interest and importance for ecological reasons and for reducing costs. Recycled polyethylene forms a significant part of the resources of available fractions of recycled polymers and polyolefin materials.

Recyclates used for applications requiring high melt viscosity materials may originate from industrial waste (IW), post-consumer recyclates (PCR), or both. The recyclate fraction may be used as the only polymer fraction or in blends with virgin polyethylene. One of the main problems with recyclate containing compounds is the relatively narrow application scope due to the lack of available recyclate volumes on the market with sufficiently high melt viscosity and suitable molecular weight distribution for the full map of applications of interest, e.g. as with products manufactured by extrusion, blow moulding, stretch blow moulding or special injection moulding processes. Basically, recycled polyethylene available in large quantities, e.g. from consumer packaging, injection moulding goods and film applications, is not suitable in applications where lower MFR or broader molecular weight distribution are preferred or required.

Therefore, there is a need in the field to modify polyethylene resins, more particularly recycled polyethylene resins, in order to increase the melt viscosity, i.e. to reduce the melt flow rate (MFR), to preferably increase the flow rate ratio (FRR), which is a ratio of two melt flow rates measured under different loads, and to keep the levels consistent during normal production allowing them to be better applied in, for example, the extrusion process or in applications requiring high melt viscosity materials of similar or other reasons, such as needs regarding product consistency, dimension stability, for requirements on mechanical properties or regarding weldability.

EP2770016 discloses a method for producing a recycled plastic material from a starting material comprising at least 80 wt-% of high density polyethylene by adding a chemical compound in the melting state of the starting material.

WO2013101767 discloses a polyethylene composition comprising polyethylene and a small amount of peroxide having a specified density and complex viscosity, where the existence of peroxide improves the melt strength and mechanical properties.

A problem of the above-described prior art processes and compositions is that they mainly deal with moulding properties, however the melt flow rate (MFR) reduction is limited or not in a controlled manner.

Thus, there remains a need for a tailored method with controlled process stages for producing polyethylene with reduced MFR and meanwhile of consistent and/or improved quality.

SUMMARY OF THE INVENTION

The objective of the present invention is to provide a process which modifies polyethylene with reduced MFR according to the need for application, in a more controlled manner without significant gel formation.

The present invention deals with a process of producing a modified polyethylene. According to the invention it is possible to produce a modified polyethylene showing reduced melt flow rate and low gel content.

The process of the invention is particularly suitable for treating and modifying recycled polyethylene, for example a polyethylene which comprises recycled polyethylene.

Recycled polyethylene is usually a non-homogeneous material which consists of a wide variety of different recycled polyethylene components with different properties, e.g. different melt flow rates. This also means that different recycled polyethylene components and their properties, e.g. melt flow rates, may differ from one day to another, depending on the origin of the recycled polyethylene material. Hereby the starting point any for modification of recycled polyethylene tend to be more difficult and the result tend to be more unpredictable compared to when using more homogeneous polyethylene, e.g. virgin polyethylene. According to the present invention, there is provided a process for treating and modifying a polyethylene comprising recycled polyethylene, and the melt flow rate thereof, with improved control.

In addition to providing a controlled reduction of the melt flow rate of a polyethylene, the present invention also provides polyethylene, in particular polyethylene comprising recycled polyethylene, with reduced variation of the polyethylene material, i.e. improved consistency of the polyethylene within a manufactured product. Hereby the risk of variations in product dimensions and appearance is lower. Accordingly, the invention enables processing polyethylene without additional negative effects on dimension accuracy and undesired surface effects, thus products with better material consistency regarding mechanical properties, long term performance, stretchability (both in molten form and in solid state) and weldability.

Accordingly, in a first aspect, the present invention provides a process for obtaining a controlled reduction of the melt flow rate (5 kg, 190° C.) (MFR) of a polyethylene, comprising the steps of:

(a) determining the starting melt flow rate (5 kg, 190° C.) ($MFR_0$) of a polyethylene, (b) feeding the polyethylene into an extrusion device,
(c) feeding peroxide in an amount of X ppm over the weight of the polyethylene into the extrusion device, wherein the amount of peroxide X is in a range of 300 ppm to 4000 ppm,
(d) mixing the polyethylene with the peroxide in the extrusion device at a temperature above the melting points of the components until substantially homogeneous,
(e) extruding and pelletizing the mixture obtained from step (d),
(f) determining the final melt flow rate (5 kg, 190° C.) ($MFR_f$) of the modified polyethylene obtained from step (e), characterized in that the final melt flow rate (5 kg, 190° C.) ($MFR_f$) of the modified polyethylene fulfils the exponential decay (equation (I)) in respect of the starting melt flow rate (5 kg, 190° C.) ($MFR_0$) and the concentration (X) of the peroxide based on the amount of polyethylene, $$MFR_f = MFR_0 \times e^{-\mu X} \quad (I)$$

wherein the exponential decay constant $\mu$ is in the range between 0.0005 to 0.005.

In another aspect, the present invention provides a process for modifying a polyethylene comprising one or more recycled polyethylene components, comprising the steps of:
(a) determining a starting melt flow rate (5 kg, 190° C.) ($MFR_0$) of the polyethylene,
(b) feeding the polyethylene into an extrusion device,
(c) feeding peroxide in an amount of X ppm over the weight of the polyethylene into the extrusion device, wherein the amount of peroxide X is in a range of 300 ppm to 4000 ppm,
(d) mixing the polyethylene with the peroxide in the extrusion device at a temperature above the melting point of the polyethylene until substantially homogeneous,
(e) extruding and optionally pelletizing the mixture obtained from step (d), wherein the polyethylene preferably has a residence time in the extrusion device of at least 25 seconds,
(f) determining the final melt flow rate (5 kg, 190° C.) ($MFR_f$) of the modified polyethylene obtained from step (e), characterized in that the final melt flow rate (5 kg, 190° C.) ($MFR_f$) of the modified polyethylene fulfils the exponential decay (equation (I)) in respect of the starting melt flow rate (5 kg, 190° C.) ($MFR_0$) and the concentration (X) of the peroxide based on the amount of polyethylene, $$MFR_f = MFR_0 \times e^{-\mu X} \quad (I)$$

wherein the exponential decay constant $\mu$ is in the range between 0.0005 to 0.005.

In yet another aspect, the present invention provides a process for obtaining a controlled reduction of the melt flow rate (5 kg, 190° C.) (MFR) of a polyethylene, comprising the steps of:
(a) determining the starting melt flow rate (5 kg, 190° C.) ($MFR_0$) of a polyethylene,
(b) defining a target melt flow rate (5 kg, 190° C.) (MFRt) for the modified polyethylene,
(c) determining the value of p for the combination of polyethylene, peroxide and the extrusion conditions, determining the required amount of peroxide (X) from the equation (II) by using the starting melt flow rate, the target melt flow rate and the value of p, $$MFRt = MFR_0 \times e^{-\mu X} \quad (II)$$

(d) feeding the polyethylene into an extrusion device,
(e) feeding peroxide in an amount of X ppm over the weight of the polyethylene into the extrusion device, wherein the amount of peroxide X is in a range of 300 ppm to 4000 ppm,
(f) mixing the polyethylene with the peroxide in the extrusion device at a temperature above the melting points of the components until substantially homogeneous,
(g) extruding and optionally pelletizing the mixture obtained from step (d),
(h) determining the final melt flow rate (5 kg, 190° C.) ($MFR_f$) of the modified polyethylene obtained from step (e).

BRIEF DESCRIPTION OF THE DRAWING

FIG. 1 shows an example plot of the final melt flow rate versus the amount of peroxide (X).

DETAILED DESCRIPTION OF THE INVENTION

Polyethylene

The polyethylene used as a raw material in the process of the present invention can be selected from virgin polyethylene, recycled thermoplastic polyethylene or a mixture thereof. More specifically, the polyethylene can be selected from virgin high density polyethylene (vHDPE), virgin medium density polyethylene (vMDPE), virgin low density polyethylene (vLDPE), virgin linear low density polyethylene (vLLDPE), virgin polyolefin plastomers (vPOP), polyolefin elastomers (vPOE), recycled high density polyethylene (rHDPE), recycled medium density polyethylene (rMDPE), recycled low density polyethylene (rLDPE), recycled linear low density polyethylene (rLLDPE), and the mixtures thereof. Preferably, when the polyethylene is selected from virgin polyethylene, it has a density of equal to or higher than 0.870 g/cm³, preferably equal to or higher than 0.900 g/cm³, more preferably equal to or higher than 0.925 g/cm³, and even more preferably equal to or higher than 0.945 g/cm³; when the polyethylene is selected from recycled polyethylene, it comprises more than 80%, preferably more than 90%, more preferably more than 95% of polyethylene. The polyethylene fraction in the recycled polyethylene preferably has a density of not lower than 0.900 g/cm³, preferably not lower than 0.925 g/cm³, more preferably not lower than 0.945 g/cm³. In a preferred embodiment, the polyethylene comprises recycled polyethylene, e.g. one or more recycled polyethylene components.

The polyethylene used as raw material in the process of the present invention may be a homopolymer of ethylene or a copolymer of ethylene with one or more alpha-olefins having from 3 to 10 carbon atoms and mixtures thereof.

The starting melt flow rate (5 kg, 190° C.) ($MFR_0$) of the polyethylene as raw material in the process of the present invention may be selected in relatively broad ranges. When the polyethylene is a homopolymer or a copolymer of ethylene the melt flow rate (5 kg, 190° C.) ($MFR_0$) is preferably from 0.5 to 400 g/10 min, preferably from 0.5 to 100 g/10 min, more preferably from 1.0 to 75 g/10 min, even more preferably from 1.5 to 50 g/10 min.

As mentioned above, the polyethylene may be a homo- or copolymer. If the polyethylene is a copolymer then it may contain from 0.1 to 30% by mole of comonomer(s), preferably from 0.1 to 20% by mole of comonomer(s), more preferably from 0.1 to 15% by mole of comonomer(s), and even more preferably from 0.1 to 10% by mole of comonomer(s), e.g. from 0.1 to 5% by mole of comonomer(s), the comonomer(s) preferably being one or more alpha-olefins having from 3 to 10 carbon atoms. For example, the ethylene copolymer may contain from 90 to 99.9% by mole, preferably from 92 to 99.5% by mole, of units derived from ethylene and from 0.1 to 10% by mole, preferably from 0.5 to 8% by mole, of units derived from the comonomer(s), the comonomer(s) preferably being one or more alpha-olefins having from 3 to 10 carbon atoms.

It is preferred that the polyethylene used as a starting material have moderate molecular weight distribution (MWD), which is defined by the polydispersity index (PI). The starting polydispersity index ($PI_0$) of the polyethylene is preferably in the range of 1-20, more preferably in the range of from 2 to 18, most preferably in the range of from 2 to 15, even more preferably in the range of from 2 to 10, especially in the range of from 2 to 5, or in the range of from 2.2 to 3, for example in the range of from 3 to 15 or in the range of from 3 to 10.

In a preferred embodiment of the present invention, the polyethylene used as starting material in the process have a combination of starting melt flow rate (5 kg, 190° C.) ($MFR_0$) in the range of from 0.1 to 20 g/10 min and a starting polydispersity index ($PI_0$) in the range of from 2 to 3.

In another preferred embodiment of the present invention, the polyethylene as starting material in the process have a combination of starting melt flow rate (5 kg, 190° C.) ($MFR_0$) in the range of from 5 to 100 g/10 min and a starting starting polydispersity index ($PI_0$) in the range of from 2.5 to 5.

The polyethylene used as raw material in the process of present invention may be in any form including particles, pellets, flakes, grinded products, or shredded film, etc.

Peroxide

It is essential in the process of the present invention that peroxide is added for generating free radicals allowing modification of the polyethylene. Typically, the peroxide decomposes in the process and the decomposition products are free radicals. Preferably, the free radical generator is selected from acyl peroxide, alkyl peroxide, hydroperoxide, perester, peroxycarbonate, and mixtures thereof.

Examples of suitable organic peroxides include di-tert-amylperoxide, 2,5-di(tert-butyl-peroxy)-2,5-dimethyl-3-hexyne, 2,5-di(tert-butylperoxy)-2,5-dimethylhexane, tert-butyl-cumylperoxide, di(tert-butyl)peroxide, dicumylperoxide, butyl-4,4-bis(tert-butylperoxy)-valerate, 1,1-bis(tert-butylperoxy)-3,3,5-trimethylcyclohexane, tert-butylperoxy-benzoate, di benzoyl peroxide, bis(tertbutylperoxyisopropyl)benzene, 2,5-dimethyl-2,5-di(benzoylperoxy)hexane, 1,1-di(tertbutylperoxy) cyclohexane, 1,1-di(tert amylperoxy)-cyclohexane, and any mixtures thereof; for example, the peroxide may be selected from 2,5-di(tert-butylperoxy)-2,5-dimethylhexane, di(tert-butylperoxyisopropyl)benzene, dicumylperoxide, tertbutylcumylperoxide, di(tert-butyl)peroxide, and mixtures thereof, for example, the peroxide is dicumylperoxide.

Preferably, the peroxide is selected from 2,5-dimethyl-2, 5-di(tert-butylperoxy)hexane, 2,5-dimethyl-2,5-di(tert-butylperoxy)hexyne-3, 3,3,5,7,7-pentamethyl-1,2,4-trioxepane, 3,6,9-triethyl-3,6,9-trimethyl-1,4,7-triperoxonane, and di-tert-butyl peroxide.

The person skilled in the art knows how to choose appropriate peroxide that will thermally decompose during the reactive modification process according to the present invention. Preferably, the half life of the peroxide is 0.1 hour at a temperature of at least 94° C., preferably at least 100° C., more preferably at least 110° C., for example, the half life of the peroxide is 0.1 hour at a temperature range of from 94° C. to 220° C., preferably in the range of from 100° C. to 190° C., like in the range of from 110° C. to 175° C.

In the modification process according to the present invention for the production of a modified polyethylene, the polyethylene is suitably mixed with peroxide in an amount of from 300 ppm to 4000 ppm, preferably from 400 ppm to 3500 ppm, more preferably from 450 ppm to 3000 ppm, based on the weight of the polyethylene The peroxide may be used in the form of a masterbatch wherein the peroxide is fed as a pre-mix (masterbatch), preferably fed directly into the extruder. Preferably, the peroxide is pre-mixed with a carrier which can be a polymer, e.g. polyethylene and polypropylene, or other materials, e.g. silica and $CaCO_3$, forming a masterbatch and then fed into the extruder.

Extrusion Device/Extruder

The process according to the present invention is suitably carried out in melt mixing equipment known to a person skilled in the art. Preferably, an extrusion device, also referred to as an extruder, or kneader is used. The streams of the polyethylene and the peroxide are suitably passed to the extruder simultaneously in the step (b) and (c) of the process in the present invention. The extruder may be any extruder known in the art. The extruder may thus be a single screw extruder, a twin screw extruder, such as a co-rotating twin screw extruder or a counter-rotating twin screw extruder, or a multi-screw extruder, such as a ring extruder. Furthermore, the extruder may be an internal mixer, such as a Banbury type mixer, a counter-rotating continuous intensive mixer (CIM), or a special single screw mixer, such as the Buss co-kneader or a TriVolution kneader. A static mixer, such as Kenics, Koch, etc., can also be used in addition to the extruder units mentioned in order to improve the distributive mixing with comparatively low heat generation. Especially preferably extruder is a co-rotating twin screw extruder or a continuous intensive mixer (CIM). Examples of suitable extruders according to the present invention include those supplied by Coperion Werner & Pfleiderer, Berstorff, Japan Steel works, Kobe Steel, and Farrel.

The size or nominal throughput in kg/hour of the extruder is a normally related to the diameter of the unit. The nominal throughput for a suitable unit could range from 50 kg/hour to 60 000 kg/hour or more and with screw or rotor diameters from 30 mm to 460 mm or more.

The extruder typically comprises a feed zone, a melting zone, a mixing zone and a die zone. Further, the melt pressed through the die is typically solidified and cut to pellets in a pelletiser.

The extruder typically has a length over diameter ratio, L/D, of from about 4:1 to about 65:1, preferably from about 5:1 to about 60:1. More preferably the L/D is from about 6:1 to about to 50:1 and even more preferably from about 7:1 to about 45:1. As it is well known in the art the co-rotating twin screw extruders usually have a greater L/D than counter-rotating twin screw intensive mixers (CIM).

Preferred length over diameter ratio, L/D, for co-rotating or counter-rotating extruders is from about 15:1 to about 65:1, preferably from about 20:1 to about 60:1. More preferably the L/D is from about 22:1 to about to 50:1 and even more preferably from about 25:1 to about 45:1.

Preferred length over diameter ratio, L/D, for counter-rotating intensive mixers (CIM) are from about 4:1 to about 15:1, preferably from about 4.5:1 to about 12:1. More preferably the L/D is from about 5:1 to about to 11:1 and even more preferably from about 6:1 to about 10:1.

The extruder may have one or more evacuation, or vent, ports for removing gaseous components from the extruder. Such gaseous components may include unreacted free radical generator or decomposition products thereof. For polyethylene recyclates, particularly when supplied in different forms such as flakes or shredded film, the infeed material may contain certain amount of entrapped moisture which preferably would need an evacuation or vacuum port to enable sufficient degassing of the material, e.g. in order to minimise void formation in the pellets. Such evacuation port should be placed in a sufficient downstream location for allowing sufficient reaction time for the peroxide with polyethylene. Suitably the evacuation port can be located within the downstream end of the melting zone or within the mixing zone.

A stripping agent, such as water, steam or nitrogen, is suitably added to the extruder to assist in removing the volatile components from the polyethylene melt. Such stripping agent, when used, is added upstream of the evacuation port or upstream of the most downstream evacuation port, if there are multiple evacuation ports. The evacuation and stripping technology could also be used to reduce the amount of odour in the pellets and in the final product.

The extruder may also have one or more feed ports for feeding further components, such as polymer, additives and the like, into the extruder. The location of such additional feed ports depends on the type of material added through the port.

Optionally, additives or other polymer components can be added to the composition during the compounding step in an amount as described above. Preferably, the composition of the invention obtained from the reactor is compounded in the extruder together with additives in a manner known in the art.

In one preferred embodiment, the extrusion step is carried out using feed rates of 100 kg/h to 70 000 kg/h, more preferably 300 kg/h to 55 000 kg/h. The throughput is typically from 500 kg/h to 50 000 kg/h in commercial production. Another preferred size of a unit with its main use with recycled polyethylene is between 700 kg/h to 5 000 kg/h in feed rate.

The screw speed of the extruder is preferably 140 rpm to 450 rpm, more preferably 170 rpm to 400 rpm and even more preferably 190 rpm to 380 rpm.

Preferably, in said extrusion step the SEI (specific energy input) of the extruder may be from 0.15 to 0.4 kWh/kg, preferably from 0.15 to 0.35 kWh/kg, more preferably from 0.15 to 0.25 kWh/kg, whereby the SEI is directly calculated from the electric input of the extruder ignoring the intrinsically limited effectiveness, e.g. energy losses from the electrical motor and transmission.

The residence time of the polyethylene in the extrusion device/extruder may vary within wide limits; usually the residence time is at least 25, preferably at least 30 and more preferably 35 seconds.

Feed Zone

The polyethylene is preferably introduced into the extruder through a feed zone. The feed zone directs the particulate polyethylene into the melting zone. Typically the feed zone is formed of a feed hopper and a connection pipe connecting the hopper into the melting zone. Usually the polyethylene flows through the feed zone under the action of gravity, i.e., generally downwards. The residence time of the polyethylene (and other components) in the feed zone is typically short, normally not more than 30 seconds, more often not more than 20 seconds, such as not more than 10 seconds. Typically the residence time is at least 0.1 seconds, such as one second.

The stream of the free radical generator can be introduced into the feed zone of the extruder, alternatively further downstream, e.g. late in the melting zone or early in the mixing zone. It may be introduced into the feed zone as a separate stream or as a premix with the polymer/polyethylene or as a masterbatch.

Melting Zone

The polyethylene preferably passes from the feed zone to a melting zone. In the melting zone the particulate polyethylene melts. The solid polyethylene particles are conveyed by drag caused by the rotating screw. The temperature then increases along the length of the screw through dissipation of frictional heat and increases to a level above the melting temperature of the polyethylene. Thereby the solid particles start to melt.

It is preferred that the screw in the melting zone, for a conventional single screw extruder, is designed so that the screw in the melting zone is completely filled. Thereby the solid particles form a compact bed in the melting zone. This happens when there is sufficient pressure generation in the screw channel and the screw channel is fully filled. There are different melting principles in different extruders and mixing devices, however, the friction between the polyethylene and the extruder screw and walls as well as between the polyethylene particles plays a major role in the melting zone to enable efficient melting of the polyethylene. For a co-rotating twin screw extruder, typically the screw in the melting zone comprises conveying elements without substantial backwards flow. However, in order to achieve compact bed some barrier or back-mixing elements may need to be installed at a suitable location, for instance, close to the downstream end of the melting zone. The screw design for obtaining a compact particle bed is well known in the extruder industry. The problem is discussed, among others, in paragraphs 7.2.2 and 8.6.2 of Chris Rauwendaal: "Polymer Extrusion", Carl Hanser Verlag, Munich 1986, which is hereby incorporated herein by reference.

Due to frictional heat the temperature increases along the length of the screw and the polyethylene starts to melt. The melting behaviour is discussed, for instance, in the above-mentioned book of Chris Rauwendaal, in the paragraph 7.3, especially in 7.3.1.1, and 7.3.2, incorporated herein by reference.

Mixing Zone

After the melting zone the polyethylene preferably passes to a mixing zone. The screw in the mixing zone typically comprises one or more mixing sections which comprise screw elements providing a certain degree of backward flow. In the mixing zone the polyethylene melt is mixed for achieving a homogeneous mixture. The mixing zone may also comprise additional components at the downstream end, such as a throttle valve or a gear pump. The extruder manufacturers usually can provide designs of mixing zones suitable for different types of polymers (like polypropylene, polyethylene and so on). Such designs are generally applicable in the process of the present invention.

The peroxide could be fed into the extruder either in the feed hopper, preferably as a premix or masterbatch, alternatively the peroxide could be introduced into the extruder early in the mixing zone downstream the melting zone and in that case as a dry mix or masterbatch via a second feedport or via a side feeder. The peroxide could also be fed in liquid form via a liquid injection system into preferably the early stage of the mixing zone of the extruder.

The temperature in the mixing zone is greater than the melting temperature of the polyethylene. Further, the temperature needs to be greater than the decomposition temperature of the peroxide. The temperature needs to be less than the decomposition temperature of the polyethylene. Suitably, the temperature is from about 5° C. greater than the melting temperature of the polyethylene, preferably from about 10° C. greater than the melting temperature of the polyethylene to preferably about 280° C., more preferably to about 250° C. and especially preferably to about 240° C. For instance, the temperature should be preferably in the range of from 165° C. to 280° C., more preferably in the range of from 170° C. to 250° C., like in the range of from 180° C. to 240° C., and even more preferably between 180° C. and 230° C.

The overall average residence time in the combined melting zone and the mixing zone of the extruder should be preferably at least about 15 seconds and more preferably at least about 20 seconds. Typically the average residence time does not exceed 60 seconds and preferably it does not exceed 55 seconds. Good results have been obtained when the average residence time was within the range of from 22 to 45 seconds. As it was discussed above, it is preferred to remove gaseous material from the extruder via one or more evacuation ports or, as they are sometimes called, vent ports. Venting of gaseous material from the extruder is well known in the industry and is discussed, for instance, in the above-mentioned book of Chris Rauwendaal, in paragraphs 8.5.2 and 8.5.3, incorporated herein by reference.

It is possible to use more than one evacuation port. For instance, there may be two ports, an upstream port for crude degassing and a downstream port for removing the remaining volatile material. Such an arrangement is advantageous if there is large amount of gaseous material in the extruder.

The vent ports are suitably located in the mixing zone. However, they may also be located at the downstream end of the melting zone. Especially if there are multiple vent ports it is sometimes advantageous to have the most upstream port within the melting zone and the subsequent port(s) in the mixing zone.

Preferably the vent ports are connected to a reduced pressure, such as from atmospheric pressure to a pressure of 0.5 bar less than atmospheric pressure, more preferably from a pressure of 0.05 bar less than atmospheric pressure to a pressure of 0.4 bar less than atmospheric pressure, It is also possible to add a stripping agent, such as water, steam, $CO_2$ or $N_2$, into the extruder. Such stripping agent, when used, is introduced upstream of the vent port or, when there are multiple vent ports, upstream of the most downstream vent port and downstream of the upstream vent port. Typically the stripping agent is introduced into the mixing zone or at the downstream end of the melting zone. Stripping is discussed, among others, in paragraph 8.5.2.4 of the book of Chris Rauwendaal, incorporated herein by reference.

Die Zone

The die zone typically comprises a die plate, which is sometimes also called breaker plate and which is a thick metal disk having multiple holes. The holes are parallel to the screw axis. The molten polyethylene is pressed through the die plate. The molten polyethylene thus forms a multitude of strands. The strands are then passed to the pelletiser.

The function of the die plate is to arrest the spiralling motion of the polyethylene melt and force it to flow in one direction.

The die zone may also comprise one or more screens which are typically supported by a breaker plate or directly by the die plate. For recycled materials, which normally are containing a number of contaminants and foreign particles, it is often required to have a specially designed melt filter unit with a continuous cleaning device or cleaning cycle, in between the extruder with the melt pressurising step and the die plate. The screens are used for removing foreign material from the polyethylene melt and also for removing gels from the polyethylene. The gels are typically foreign rubber particles or undispersed high molecular weight polymer, for instance, cross-linked polymer.

Pelletiser

The strands of molten polyethylene are preferably passed through the die plate into the pelletiser. Usually, the pelletiser comprises a water bath and a set of rotating knives adjacent to the die plate. The strands are cooled and solidified in the water and the rotating knives cut the strands to pellets. The size of the pellets can be adjusted by selecting a suitable number of knives and selecting a suitable rotation speed. The water temperature in the pelletiser is typically from 20 to 90° C., and preferably from 30 to 70° C. A stream of water, into which the pellets are suspended, is withdrawn from the pelletiser. The pellets are separated from the water stream after which they are dried and recovered. The water stream is passed to a cooling step and returned into the pelletiser. Optionally, fresh water is added to the water stream for compensating losses.

For smaller units, also strand pelletising technique is often used, i.e. strands from the molten polyethylene are discharged from the die plate and pulled into a water bath for cooling and cut in solid form after an initial drying step, usually enabled via air drying. The water temperature in the water bath is normally from 10 to 90° C. and more preferably from 20 to 80° C.

Modified Polyethylene

The modified polyethylene is characterised by the correlation between the final melt flow rate (5 kg, 190° C.) ($MFR_f$) and the concentration (X) of the peroxide based on the amount of polyethylene.

The final melt flow rate (5 kg, 190° C.) ($MFR_f$) of the modified polyethylene fulfils the exponential decay (equation (I)) in respect of the starting melt flow rate (5 kg, 190° C.) ($MFR_0$) and the concentration (X) of the peroxide based on the amount of polyethylene, $$MFR_f = MFR_0 \times e^{-\mu X} \qquad (I)$$

The exponential decay constant $\mu$ is in the range of from 0.0005 to 0.005, preferably in the range of from 0.001 to 0.005.

The final melt flow rate ($MFR_f$) of the modified polyethylene is usually in the range of from 0.1 to 8.0, suitably from 0.1 to 5.0, preferably from 0.2 to 4.0, and more preferably from 0.2 to 3 g/10 min.

Preferably, the modified polyethylene obtained from the process of the present invention has a gel content characterized by xylene hot insoluble content (XHU) of below 2.0%, preferably of below 1.6%, more preferably of below 1.2%, even more preferably below 1.0% and most preferably below 0.7%.

Preferably, the molecular weight distribution of the modified polyethylene obtained from the process of the present invention does not show significant change. Preferably, the modified polyethylene have a polydispersity index ($PI_f$) in the range of from 2 to 50, preferably in the range of from 4 to 40, more preferably in the range of from 5 to 30, most preferably in the range of from 5 to 15. Preferably, the final polydispersity index ($PI_f$) is broader than the starting polydispersity index ($PI_0$) of the polyethylene.

In a further preferred embodiment of the process in present invention, a proper melt viscosity ratio (eta 0.05/eta 300), which is defined as melt viscosity at 190° C. and 0.05 rad/s frequency divided by the melt viscosity at a frequency of 300 rad/s, is also required. Preferably, the modified and final (eta 0.05/eta 300)$_f$ ratio is larger than the starting value (eta 0.05/eta 300)$_0$, more preferably the final (eta 0.05/eta 300)$_f$ ratio is at least 35% larger than the starting value (eta 0.05/eta 300)$_0$, even more preferably the final (eta 0.05/eta 300)$_f$ ratio is at least 50% larger than the starting value (eta 0.05/eta 300)$_0$ and most preferably the final (eta 0.05/eta 300)$_f$ ratio is at least 100% larger than the starting value (eta 0.05/eta 300)$_0$. In an especially preferred embodiment, the final (eta 0.05/eta 300)$_f$ ratio is at least 500% larger than the starting value (eta 0.05/eta 300)$_0$, for example, the final (eta 0.05/eta 300)$_f$ ratio is at least 800% larger than the starting value (eta 0.05/eta 300)$_0$ In a further preferred embodiment of the present invention, the flow rate ratio ($FRR_{21/5}$, 190° C.), which is defined as $MFR_{21}/MFR_5$, is of importance for the melt processing behavior of the modified polyethylene. Preferably the final $FRR_{21/5,f}$ is larger than the starting value $FRR_{21/5,0}$, more preferably, the modified and final $FRR_{21/5,f}$ is at least 35% larger than the starting value $FRR_{21/5,0}$, even more preferably the modified and final $FRR_{21/5,f}$ is at least 50% larger than the starting value $FRR_{21/5,0}$ and most preferably the modified and final $FRR_{21/5,f}$ is at least 100% larger than the starting value $FRR_{21/5,0}$. In an especially preferable embodiment, the modified and final $FRR_{21/5,f}$ is at least 150% larger than the starting value $FRR_{21/5,0}$, more preferably the modified and final $FRR_{21/5,f}$ is at least 200% larger than the starting value $FRR_{21/5,0}$, for example, the modified and final $FRR_{21/5,f}$ is at least 300% larger than the starting value $FRR_{21/5,0}$.

EXAMPLES

The following definitions of terms and determination methods apply for the above general description of the invention as well as to the below examples unless otherwise defined.

Measuring Methods

The following definitions of terms and determination methods apply for the above general description of the invention as well as to the below examples unless otherwise defined.

Density

Density of the polyethylene was measured according to ISO 1183-1:2004 (method A) on compression moulded specimen prepared according to EN ISO 1872-2 (February 2007) and is given in kg/m$^3$.

Melt Flow Rate

The melt flow rate (MFR) is determined according to ISO 1133 and is indicated in g/10 min. The MFR is an indication of the flowability, and hence the processability, of the polymer/polyethylene for specific conditions. The higher the melt flow rate, the lower the viscosity of the polymer/polyethylene. The MFR is determined at 190° C. for polyethylene and at a loading of 2.16 kg ($MFR_2$), 5.00 kg ($MFR_5$) or 21.6 kg ($MFR_{21}$).

The quantity FRR (flow rate ratio) is an indication of molecular weight distribution, particularly important to reflect key parts for the melt processing behaviour of the polymer/polyethylene, e.g. for indication of the melt shear thinning properties and denotes the ratio of flow rates at different loadings. Thus, $FRR_{21/5}$ denotes the value of $MFR_{21}/MFR_5$.

XHU

About 2 g of the polymer/polyethylene (mp) are weighed and put in a mesh of metal and the combined weight of the polymer/polyethylene and the mesh is determined (mp+m). The polymer/polyethylene in the mesh is extracted in a soxhlet apparatus with boiling xylene for 5 hours. The eluent is then replaced by fresh xylene and the boiling is continued for another hour. Subsequently, the mesh is dried and weighed again for obtaining the combined mass of hot xylene insoluble polymer/polyethylene (XHU) and the mesh (mXHU+m). The mass of the xylene hot insoluble polymer/polyethylene (mXHU) obtained by the formula (mXHU+m)−m=mXHU is put in relation to the weight of the polymer/polyethylene (mp) to obtain the fraction of xylene insoluble polymer/polyethylene mXHU/mp. This fraction of xylene insoluble polymer/polyethylene is then taken as the gel content.

Dynamic Shear Measurements (Frequency Sweep Measurements)

The characterisation of polymer/polyethylene melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t)=\gamma_0 \sin(\omega t) \qquad (1)$$

If the applied strain is within the linear viscoelastic regime, the resulting sinusoidal stress response can be given by $$\sigma(t)=\sigma_0 \sin(\omega t+\delta) \qquad (2)$$

where $\sigma_0$ and $\gamma_0$ are the stress and strain amplitudes, respectively $\omega$ is the angular frequency $\delta$ is the phase shift (loss angle between applied strain and stress response)

t is the time

Dynamic test results are typically expressed by means of several different rheological functions, namely the shear storage modulus G', the shear loss modulus, G", the complex shear modulus, G*, the complex shear viscosity, η*, the dynamic shear viscosity, η', the out-of-phase component of the complex shear viscosity η" and the loss tangent, tan δ which can be expressed as follows:

$$G' = \frac{\sigma_0}{\gamma_0}\cos\delta \ [Pa] \quad (3)$$

$$G' = \frac{\sigma_0}{\gamma_0}\sin\delta \ [Pa] \quad (4)$$

$$G^* = G' + iG'' \ [Pa] \quad (5)$$

$$\eta^* = \eta' - i\eta'' \ [Pa.s] \quad (6)$$

$$\eta' = \frac{G''}{\omega} \ [Pa.s] \quad (7)$$

$$\eta'' = \frac{G'}{\omega} \ [Pa.s] \quad (8)$$

Besides the above mentioned rheological functions one can also determine other rheological parameters such as the so-called elasticity index EI(x). The elasticity index Ei(x) is the value of the storage modulus, G' determined for a value of the loss modulus, G" of x kPa and can be described by equation 10.

$$EI(x)=G' \text{ for } (G''=x \text{ kPa})[Pa] \quad (9)$$

For example, the EI(5 kPa) is the defined by the value of the storage modulus G', determined for a value of G" equal to 5 kPa.

The determination of so-called Shear Thinning Indexes is done, as described in equation 10.

$$SHI(x/y) = \frac{Eta^* \text{ for } (G^* = x \text{ kPa})}{Eta^* \text{ for } (G^* = y \text{ kPa})} \quad (10)$$

For example, the SHI (2.7/210) is defined by the value of the complex viscosity, in Pa·s, determined for a value of G* equal to 2.7 kPa, divided by the value of the complex viscosity, in Pa·s, determined for a value of G* equal to 210 kPa.

The melt viscosity ratio Eta0.05/Eta300 is the complex melt viscosity at 0.05 rad/s frequency divided by the complex melt viscosity at 300 rad/s frequency. The Eta0.05/Eta300 value reflects the molecular weight distribution of the polymer/polyethylene with particular relevance for the melt processing behavior.

The polydispersity index, PI, is defined by equation 11.

$$PI = \frac{10^5}{G'(\omega_{COP})}, \omega_{COP} = \omega \text{ for } (G' = G'') \quad (11)$$

where, $\omega_{cop}$ is the cross-over angular frequency, determined as the angular frequency for which the storage modulus, G' equals the loss modulus, G".

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus '—Interpolate y-values to x-values from parameter' and the "logarithmic interpolation type" were applied.

Residence Time Calculation (Melting and Mixing Section of the Extruder)

The average residence time calculated based on the conditions for the screw section from the first kneading block in the melting section further downstream to and including the last screw element upfront the screw tip. It is principally based on the relation between the free volume in this screw sections, the fill degree of polymer/polyethylene and the throughput of the extruder. The free volume is defined as the volume of the extruder barrel which is practically is not occupied of the screw (s) or rotors when inserted in the barrel, i.e. the volume which could be filled with the polymer/polyethylene and other ingredients during the processing the compounds. The extruder is normally not totally filled with the ingredients during the processing which has been considered and an average fill factor, Ff, of 0.52 has been used.

Average RT(seconds)=(Free volume*Fill factor*3600/(Throughput*Melt Density))

with
  Average residence time in (seconds)
  Free volume in (dm$^3$)
  Fill factor; average value of 0.52 is used
  Extruder throughput in (kg/hour)
  Melt density in (kg/dm$^3$) and an average melt density of HDPE at ~190-200° C. of 0.75 kg/dm$^3$ is used for unfilled PE products For the Coperion ZSK32 co-rotating twin screw extruder used in the Examples the free volume has been calculated based on the extruder screw design (typical polyethylene type of screw configuration) from the first kneading block in the melting section to and including the last screw element upfront the extruder screw tip. For other screw designs the first part of the melting sections and last part of the mixing sections are defined as follows; for single screw extruders, the first part of the melting section is where the compression section of the screw starts, alternatively where a grooved feed section is starting. The last part of the mixing section is defined as the end of the screw tip of the screw. For a counter-rotating internal mixer, the melting sections starts when the conveying section ends and the rotor/paddle sections starts. The last part of the mixing section is defined as the rotor or screw position when the first polymer/polyethylene has the ability to exit the main mixer unit.

The residence time at high temperatures which could be relevant to include to the residence time from the melting and mixing sections above, should only be added to a total residence time including the residence time calculated above from the melting and mixing sections, if this additional residence time is expected to exceed more than 5 seconds based on a calculation made by the person skilled in art, e.g. based on the additional equipment downstream the extruder screw/s such as static mixers, transition pieces/channels, gear pumps, pressurizing extruders or filter sections or the like.

For the ZSK32 extruder used in the examples, the extruder was directly connected to a die plate and strand pelletising unit and hence no additional residence time above 5 seconds could be observed, based on the principles described above. The average residence time calculated for the examples produced in the ZSK extruder were in all cases 25 seconds and this was found to be sufficient for the purpose based on pre-tests.

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362
[2] The influence of molecular structure on some rheological properties of polyethylene", Heino, E. L., Borealis Polymers Oy, Porvoo, Finland, Annual Transactions of the Nordic Rheology Society, 1995).
[3] Definition of terms relating to the non-ultimate mechanical properties of polymers, Pure & Appl. Chem., Vol. 70, No. 3, pp. 701-754, 1998.

Example 1

The following peroxides were used in the examples:
Pox 1: Peroxide masterbatch commercially available from AkzoNobel, containing 5 wt % of 2,5-Dimethyl-2,5-di(tert-butylperoxy)hexane (Trigonox 101, CAS 7863-7) and the carrier material is Polypropylene Random copolymer. Parameters of Trigonox 101: Mw=290 processing temp: 175° C. Typical crosslink temp: 175° C.

Pox 2: Peroxide commercially available from AkzoNobel as Trigonox 145-E85, containing 45 wt % of 2,5-Dimethyl-2,5-di(tert-butylperoxy)hexyne-3 [1068-27-5] on a combination of calcium carbonate and silica carrier. Parameters of Trigonox 145-E85: Mw=286 processing temp: 145° C. Typical crosslink temp: 185° C.

Pox 3: Peroxide commercially available from AkzoNobel as Trigonox 311, containing 50 wt % of 3,3,5,7,7-Pentamethyl-1,2,4-trioxepane [215877-64-8] on silica carrier. Parameters of Trigonox 311: Mw=174 processing temp 180° C.; Typical crosslink temp: 220° C.

The following polyethylene samples were used in the examples:

PE 1: Virgin polyethylene MB7541 commercially available form Borealis AG, which is a bimodal, high-density polyethylene with a density of 954 kg/m$^3$ determined according to ISO 1183 and a Melt Flow Rate (190° C./2.16 kg) of 4 g/10 min determined according to ISO 1133.

PE 2: Post consumer Recyclate "Recythen HDPE" commercially available from Interseroh Dienstleistungs GmbH, containing Mixture of different PE-Types but mostly HDPE, having a density of 959 kg/m3 determined according to ISO 1183 and a Melt Flow Rate (190° C./2.16 kg) of 0.4 g/10 min determined according to ISO 1133.

A ZSK32 co-rotating twin screw extruder having L/D of 48 was used for the modification of the examples. The recipe and analysis data is summarised in Table 1. The MFR decreasing curve of PE 1 via amount of Pox 1 is shown in FIG. 1

FIG. 1 shows how the value of the decay constant µ is determined. The exponential decreasing curve of the melt flow rate (5 kg, 190° C.) of polyethylene sample PE 1 is plotted against the content of the peroxide Pox 1 in the process. The MFR$_0$ is 13 g/10 min. The exponential decay constant µ is then determined by the least squares method and a value of 0.00108 is thus obtained.

TABLE 1

| Test | PE | Pox | Pox amount (ppm) | MFR (190/5) g/10 min | µ | PI | FRR 21/5 | Eta0.05/eta300 | XHUw wt-% | SHI$_{2.7/210}$ |
|---|---|---|---|---|---|---|---|---|---|---|
| CE1 | 1 | 1 | 0 | 2.2 | — | 2...6 | 20.0 | 53 | 0 | 51 |
| IE1 | 1 | 1 | 500 | 0.9 | 0.0020 | N/A | 47...4 | 149 | 0.17 | 358 |
| IE2 | 1 | 1 | 1000 | 0.3 | 0.0020 | N/A | 77.9 | 285 | 0.19 | N/A |
| IE3 | 1 | 2 | 500 | 1.6 | 0.0005 | 3.4 | 27.7 | 74 | 0.08 | 76 |
| CE2 | 1 | 3 | 1000 | 1.7 | 0.0003 | 3.1 | 26.6 | 67 | 0.08 | 65 |
| CE3 | 2 | 1 | 0 | 13.0 | — | 1.2 | 11.5 | 11 | 0 | — |
| IE4 | 2 | 1 | 500 | 6.5 | 0.0011 | 2.0 | 16.6 | 37 | 0 | 40 |
| IE5 | 2 | 1 | 1000 | 3.9 | 0.0011 | 5.6 | 21.4 | 71 | 0.03 | 93 |
| IE6 | 2 | 1 | 1500 | 2.5 | 0.0011 | 12.8 | 27.6 | 110 | 0.25 | 181 |
| IE7 | 2 | 1 | 2000 | 1.5 | 0.0011 | 20.0 | 39.3 | 144 | 0.20 | 309 |
| IE8 | 2 | 1 | 2500 | 0.8 | 0.0011 | 36.8 | 62.5 | 178 | 0.30 | 517 |
| IE9 | 2 | 1 | 3000 | 0.6 | 0.0011 | — | 64 | 224 | 0.35 | — |
| IE10 | 2 | 1 | 3500 | 0.3 | 0.0011 | — | 101 | 269 | 0.50 | — |

The invention claimed is:

1. A process for obtaining a controlled reduction of the melt flow rate (5 kg, 190° C.) (MFR) of a polyethylene by modifying the polyethylene, wherein the polyethylene comprises recycled polyethylene and is a homopolymer or is a copolymer containing from 0.1 to 30% by mole of comonomer(s), the polyethylene having a starting melt flow rate (5 kg, 190° C.) (MFR$_0$) and a melting temperature, the process comprising the steps of:
  (a) determining the starting melt flow rate (5 kg, 190° C.) (MFR$_0$) of the polyethylene,
  (b) feeding the polyethylene into an extrusion device comprising a feed zone, a melting zone, a mixing zone, and a die zone,
  (c) feeding a peroxide into the extrusion device, wherein the peroxide is provided in an amount of X ppm over the weight of the polyethylene, wherein the amount of peroxide X is in a range of 300 ppm to 4000 ppm,
  (d) mixing the polyethylene with the peroxide in the extrusion device at a temperature above the melting point of the polyethylene to form a mixture that is substantially homogeneous,
  (e) extruding the mixture obtained from step (d) to provide a modified polyethylene having a final melt flow rate (5 kg, 190° C.) (MFR$_f$), (f) determining the final melt flow rate (5 kg, 190° C.) (MFR$_f$) of the modified polyethylene obtained from step (e), characterized in that:

the mixture comprising the polyethylene and the peroxide is heated to a temperature in the range of from 170 to 250° C.;

the overall average residence time in the combined melting zone and mixing zone of the extruder is from 15 to 60 seconds;

the final melt flow rate (5 kg, 190° C.) (MFR$_f$) of the modified polyethylene fulfills an exponential decay defined by equation (I) with respect to the starting melt flow rate (5 kg, 190° C.) (MFR$_0$) and the concentration (X) of the peroxide based on the amount of polyethylene, $$MFR_f = MFR_0 \times e^{-\mu X} \quad (I)$$

wherein μ is an exponential decay constant and is from 0.0005 to 0.005; and the final melt flow rate (MFR$_f$) of the modified polyethylene is in the range of from 0.1 to 8.0 g/10 min; and wherein the process further comprises the steps of:

defining a target melt flow rate (5 kg, 190° C.) (MFR$_t$) for the modified polyethylene, determining the value of μ in equation (I) using the starting melt flow rate MFR$_0$, the final melt flow rate MFR$_f$, and the amount of the peroxide X for the combination of the polyethylene, the peroxide, the temperature at which the mixture comprising the polyethylene and the peroxide is heated, and the overall average residence time in the combined melting zone and mixing zone of the extruder, using the determined value of μ, the starting melt flow rate MFR$_0$, the target melt flow rate MFR$_t$, and equation (II) to determine the amount of peroxide (X) required to achieve the target melt flow rate, $$MFR_t = MFR_0 \times e^{-\mu X} \quad (II), \text{ and}$$

feeding the required amount of peroxide X determined from equation (II) for achieving the target melt flow rate into the extrusion device in step (c), such that the final melt flow rate of the modified polyethylene is the target melt flow rate.

2. The process according to claim 1, characterized in that the polyethylene has a residence time in the extrusion device of at least 25 seconds.

3. The process according to claim 1, characterized in that the extrusion is carried out at a specific energy input (SEI) of from 0.15 to 0.4 kWh/kg.

4. The process according to claim 1, characterized in that the starting melt flow rate (5 kg, 190° C.) (MFR$_0$) of the polyethylene is from 0.5 to 100.0 g/10 min.

5. The process according to claim 1, characterized in that the polyethylene has a starting polydispersity index (PI$_0$) of from 1 to 20.

6. The process according to claim 1, characterized in that the modified polyethylene has a xylene insoluble content (XHU) of below 2.0%.

7. The process according to claim 1, characterized in that the modified polyethylene has a polydispersity index (PI$_f$) in the range of from 2 to 50.

8. The process according to claim 1, characterized in that the polyethylene is selected from homopolymers of ethylene, copolymers of ethylene and one or more alpha-olefins having from 3 to 10 carbon atoms, and mixtures thereof.

9. The process according to claim 1, characterized in that the polyethylene comprises a copolymer of ethylene and a comonomer, wherein the comonomer is one or more alpha-olefins having from 3 to 10 carbon atoms, wherein the copolymer contains from 0.1 to 15% by mole of the comonomer.

10. The process according to claim 1, characterized in that the extrusion device is a twin screw extruder or continuous intensive mixer.

11. The process according to claim 1, characterized in that the extrusion device has a length over diameter ratio, L/D, of from 4:1 to 65:1.

12. The process according to claim 1, wherein the peroxide is fed into the extrusion device in the feed zone or the mixing zone.

13. The process according to claim 1, characterized in that step (e) of the process further comprises pelletizing the mixture.

14. The process according to claim 1, characterized in that the extrusion device is a co-rotating twin screw extruder.

15. The process according to claim 1, characterized in that the extrusion device further comprises one or more evacuation ports.

16. The process according to claim 1, characterized in that the peroxide is added as a premix or masterbatch.

* * * * *